United States Patent [19]

Hasegawa

[11] Patent Number: 5,301,195
[45] Date of Patent: Apr. 5, 1994

[54] CIRCUIT FOR MULTIFRAME SYNCHRONIZATION

[75] Inventor: Atsushi Hasegawa, Tokyo, Japan

[73] Assignee: NEC Corporation, Tokyo, Japan

[21] Appl. No.: 858,879

[22] Filed: Mar. 27, 1992

[30] Foreign Application Priority Data

Mar. 29, 1991 [JP] Japan .................................. 3-089355

[51] Int. Cl.$^5$ ................................................ H04J 3/06
[52] U.S. Cl. ................................. 370/105.1; 375/116
[58] Field of Search ............... 370/105.1, 105.41, 106, 370/108, 100.1, 102; 375/31, 32, 106, 114, 116

[56] References Cited

U.S. PATENT DOCUMENTS

| | | | |
|---|---|---|---|
| 4,744,081 | 5/1988 | Buckland | 370/105.1 |
| 4,794,626 | 12/1988 | Tanabe et al. | 370/105.1 |
| 4,984,238 | 1/1991 | Watanabe et al. | 370/105.1 |
| 5,020,057 | 5/1991 | Taniguchi et al. | 370/105.1 |
| 5,113,395 | 5/1992 | Murakami et al. | 370/105.1 |
| 5,128,945 | 7/1992 | Enns et al. | 370/105.1 |

*Primary Examiner*—Benedict V. Safourek
*Assistant Examiner*—Dang Ton
*Attorney, Agent, or Firm*—Sughrue, Mion, Zinn, Macpeak & Seas

[57] ABSTRACT

A synchronization circuit for a multiframe signal based upon a multiframe synchronization pattern of a plurality of frame bits inserted in the multiframe signal at a predetermined period is disclosed. A shift register(11) stores and sequentially shifts state data each representing degree of the synchronization, the number of states corresponding to the number of the frame bits. The value of the multiframe synchronization pattern expected for the input at the each state up to establishment of the multiframe synchronization is stored in a memory(14). The past state data for the predetermined period is read out from the shift register in response to an input of the multiframe signal. In a state decision circuit(13), the value of the multiframe synchronization pattern for the read out state data is read out from the memory. The value of the read out multiframe synchronization pattern and the input multiframe signal is compared, the state data representing the subsequent transition state is applied to the input of the shift register in response to the coincident detection, and determines establishment of multiframe synchronization when the state transition to a predetermined state occurs.

5 Claims, 7 Drawing Sheets

| STATE | STATE BIT PATTERN | EXPECTED VALUE |
|---|---|---|
| 0 | 0 0 0 | 0 |
| 1 | 0 0 1 | 0 |
| 2 | 0 1 0 | 1 |
| 3 | 0 1 1 | 0 |
| 4 | 1 0 0 | 1 |
| 5 | 1 0 1 | 1 |
| 6 | 1 1 0 | 0 |

| STATE | STATE BIT PATTERN | EXPECTED VALUE |
|---|---|---|
| 0 | 0 0 0 0 | 1 |
| 1 | 0 0 0 1 | 0 |
| 2 | 0 0 1 0 | 0 |
| 3 | 0 0 1 1 | 0 |
| 4 | 0 1 0 0 | 1 |
| 5 | 0 1 0 1 | 1 |
| 6 | 0 1 1 0 | 0 |
| 7 | 0 1 1 1 | 1 |
| 8 | 1 0 0 0 | 1 |
| 9 | 1 0 0 1 | 1 |
| 10 | 1 0 1 0 | 0 |
| 11 | 1 0 1 1 | 0 |
| 12 | 1 1 0 0 | 1 |

CIRCUIT FOR MULTIFRAME SYNCHRONIZATION

BACKGROUND OF THE INVENTION

The present invention relates generally to a data communication system, more particularly to a circuit for establishing multiframe synchronization at the receiving end of a multiframe data communication system.

In time-division multiplexing data communication, it is typical to repeat frames at a predetermined period. One method for so doing is a so-called multiframe method wherein a number of frames constitute a unit. In the multiframe method, a multiframe is, for example, composed of 1,544 kbits/s 24 frames as illustrated in FIG. 9 and each frame comprises 193 bits of data. The first of every 4 frames of the 24 frames, i.e., the 1st, 5th, 9th, 13th, 17th and 21st frames contain a frame bit (referred to as F-bit hereinafter) at its head. These 6 F-bits constitute the following bit pattern (1):

"001011"   (1)

When this bit pattern (referred to as 24-frame multiframe sync pattern) is detected, it is determined that the multiframe synchronization has been established.

FIG. 10 illustrates a multiframe synchronization circuit used for detecting conventional multiframe synchronization (sync) pattern. Provided are five shift registers 21-1 through 21-5 in the circuit. Each shift register is designed to store the received data for four multiframes, that is, 4×193 bits received data to shift the bit sequentially to the left in synchronism with the received clock pulses.

Each output from the first to fourth shift registers 21-1 through 21-4 is split in two, one to be applied to input terminals $D_1$ through $D_4$ of a coincident detection circuit 22 and the other to the input of the subsequent shift register. The output of the final shift register 21-5 is connected to input terminal $D_5$ of the coincident detection circuit 22. The received data 23 from a receiving circuit (not shown) is applied to input terminal $D_0$ of the coincident detection circuit 22 and also to the input of the first shift register 21-1.

The operation of the conventional multiframe synchronization circuit of the above construction will be described hereunder. On supplying the received data 23 from the receiving circuit in a bit by bit manner, such data 23 is applied to both input terminal $D_0$ of the coincident detection circuit 22 and the input of the first shift register 21-1. In this way, applied to input terminal $D_0$ of the coincident detection circuit 22 is the most recent bit data. The bit data applied to the first shift register 21-1 is sequentially shifted to the left in the drawing in synchronism with the received clock pulse. When shifted 4×193 bits equal to the full 4-frame data, the first bit data is applied to input terminal $D_1$ of the coincident detection circuit 22 and also to the input of the second shift register 21-2. This means that the bit data at input terminal $D_1$ of the coincident detection circuit 22 is 4-frames old.

Similarly, the 3rd through 5th shift registers 21-3 through 21-5 output bit data 4 frames old as compared with that applied to their respective inputs. And such 4-frame old bit data are applied to the respective input terminals $D_3$ through $D_5$ of the coincident detection circuit 22. In this way, 6 bit data with phase delayed by 4 frames each are simultaneously applied to the input terminals $D_0$ through $D_5$ of the coincident detection circuit 22. The coincident detection circuit 22 monitors the bit data at the input terminals $D_0$ through $D_5$ to generate a sync pattern match signal 24 when the bit pattern is equal to the pattern as given by the above expression (1).

FIG. 5 graphically illustrates a frame configuration of a 12 multi-frame signal including 12-frame multiframe. As shown in FIG. 7, the 12 front bits (or F bits) of the 12 frames are configured to take the sync pattern given by the following expression (2):

"100011011100"   (2)

In the case of the 12 multiframe signal, 11 stages of 193 bit long shift registers are used and the multiframe sync is carried out by using the coincident detection circuit 22 (FIG. 10) to detect the bit pattern given by the above expression (2). The total capacity of the shift registers is 2123 bits in this particular example.

SUMMARY OF THE INVENTION

It is an object of the present invention to provide a multiframe synchronization circuit capable of simplifying the circuit construction.

It is another object of the present invention to provide a multiframe synchronization circuit with a reduced cost.

According to the present invention there is provided a circuit for synchronizing a multiframe signal based on a multi-frame synchronization pattern of frame bits inserted in the multiframe signal at a predetermined period comprising:

a shift register for storing and sequentially shifting state data each representing degree of the synchronization, the number of states corresponding to the number of the frame bits;

storage means to store the value of the multiframe synchronization pattern expected for the input at each state up to establishment of the multiframe synchronization;

a first read-out means for reading out the past state data for the predetermined period from the shift register in response to an input of the multiframe signal;

a second read-out means for reading out from the storage means the value of said multiframe synchronization pattern for the state data read out by the first read-out means;

comparing means for comparing the value of the multiframe synchronization pattern read out by the second read-out means with the input multiframe signal;

applying means to apply the state data representing the subsequent transition state to the input of the shift register in response to the detection of the coincident by the comparison means; and determining means to determine establishment of multiframe synchronization when the state transition to a predetermined state occurs.

In the above, an expected value is stored in the shift register for the multiframe signal in each state up to the multiframe synchronization along with each state. When the multiframe signal coincident with the expected value is entered under the condition represented by the past state data read out from the shift register, the output data representing the subsequent transition state is stored in the shift register. When the transition reaches a predetermined state, it is determined that the multiframe synchronization has been established.

Other objects and features will be evident from the following description with reference to the attached drawings.

DETAILED DESCRIPTION OF A PREFERRED EMBODIMENT

A preferred embodiment of the present invention is described in detail as follows with reference to the accompanying drawings.

Figure 1:
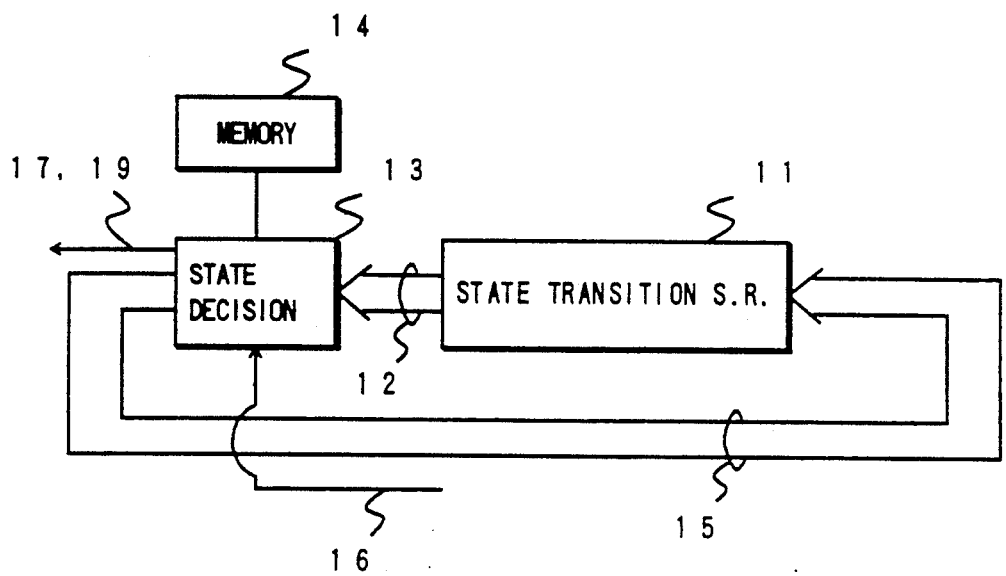
FIG. 1 is a block diagram of the multiframe synchronization circuit according to one embodiment of the present invention.

Illustrated in FIG. 1 is one embodiment of a multi-point monitoring circuit for multiframe synchronization according to the present invention. Included in this circuit is a state transition shift register 11 the output of which is connected to a state decision circuit 13 by way of a 3-bit-wide data bus 12. Connected to the state decision circuit 13 are a memory 14 and a 3-bit-wide data bus 15 to couple the output to the input side of the state transition shift register 11. The state decision circuit 13 is configured to sequentially input bit data of a 24 multi-frame signal 16 in synchronism with a receiving clock pulse from a receiving circuit (not shown) and also to receive a 3-bit-wide bit pattern (referred to hereafter as the state bit pattern) from the state transition shift register 11.

Figure 2:
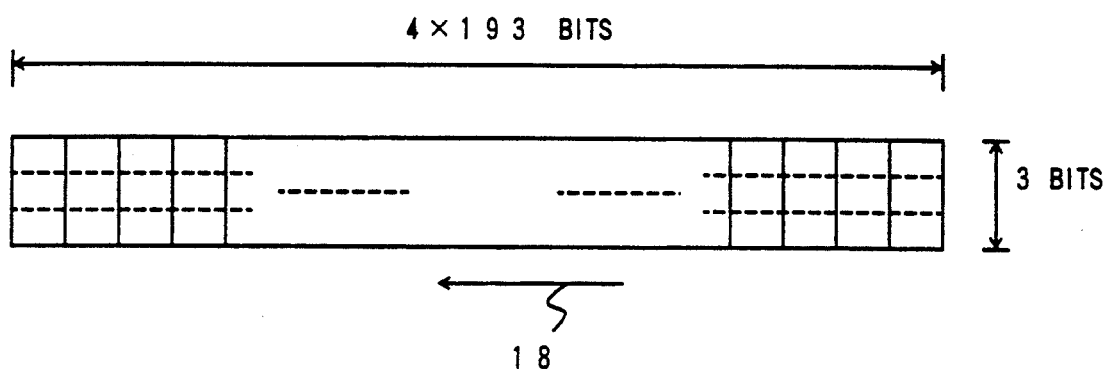
FIG. 2 is an internal construction of a state transition shift register in the multiframe synchronization circuit of FIG. 1.
Figure 9:
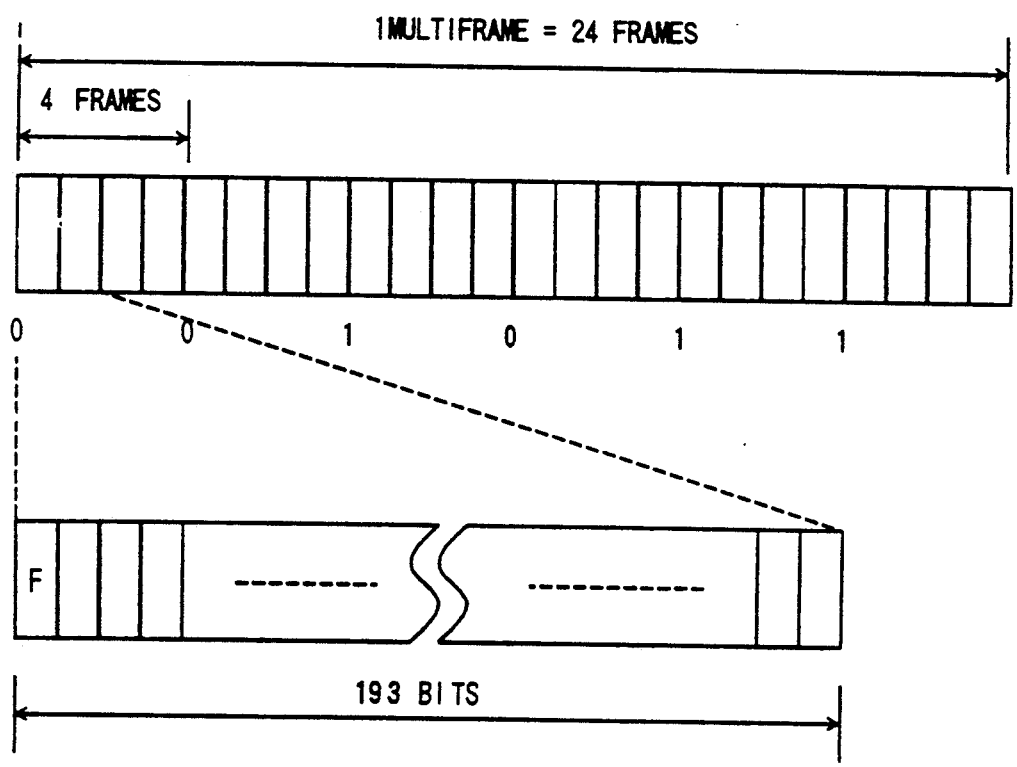
FIG. 9 shows a frame configuration of a 1,544 kbits/s 24 multiframe signal.
Figure 10:
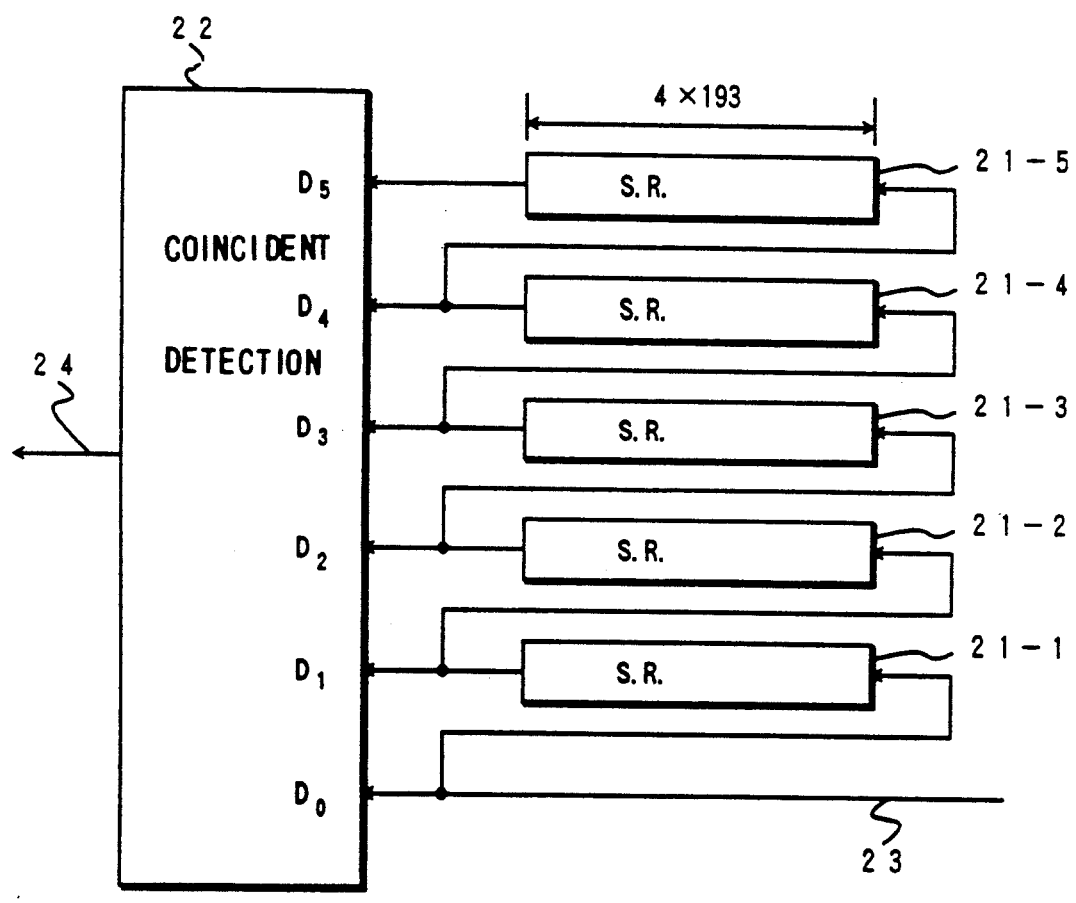
FIG. 10 is a block diagram of a conventional circuit for multiframe synchronization.

As shown in FIG. 2, the state transition shift register 11 is a 3-bit-wide and 4×193 bit long shift register. It shifts 3-bit input from the output side of the state decision circuit 13 as a set sequentially in the direction as shown by an arrow 18. The length 4×193 bits of the state transition shift register 11 is equivalent to the 4-frame data of the 24 multiframe data as illustrated in FIG. 9. Initially, the state transition shift register 11 is reset to all "0".

Figures 3, 5:
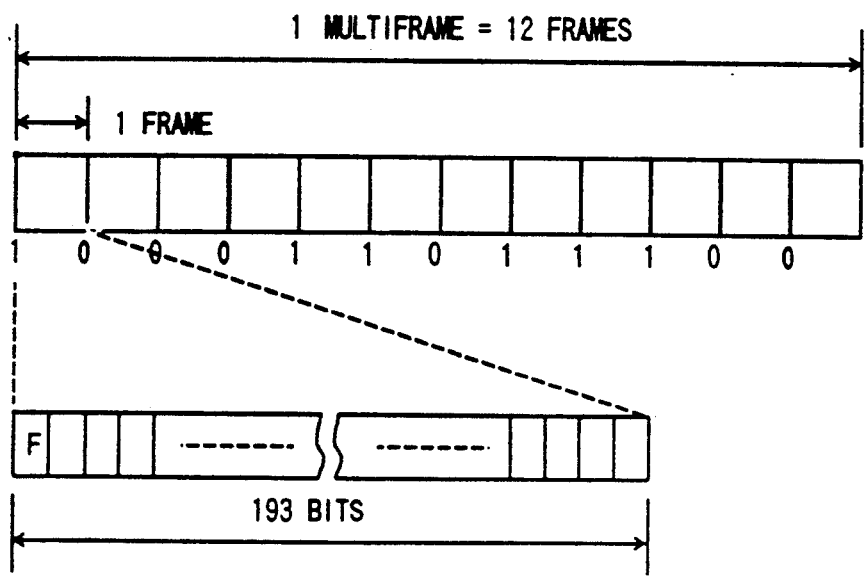
FIG. 3 is an explanatory drawing to show the contents in the memory in the circuit of FIG. 1.
FIG. 5 shows a frame configuration of a 1,544 kbits 12 multiframe signal.

FIG. 3 illustrates the contents in the memory 14. As illustrated in FIG. 3, the memory 14 stores the state bit pattern, or seven transition states (FIG. 4) to be subjected to decision of the state decision circuit 13 along with the expected value at each state which will be discussed in detail hereinafter.

The state decision circuit 13 compares the expected value from the memory 14 to the 24 multiframe signal 16 at the time when a state bit pattern is applied from the state transition shift register 11. A synchronization (sync) signal 17 is generated when the total 6 bits at every 4 frames are equal to the multiframe sync pattern "001011".

Figure 4:
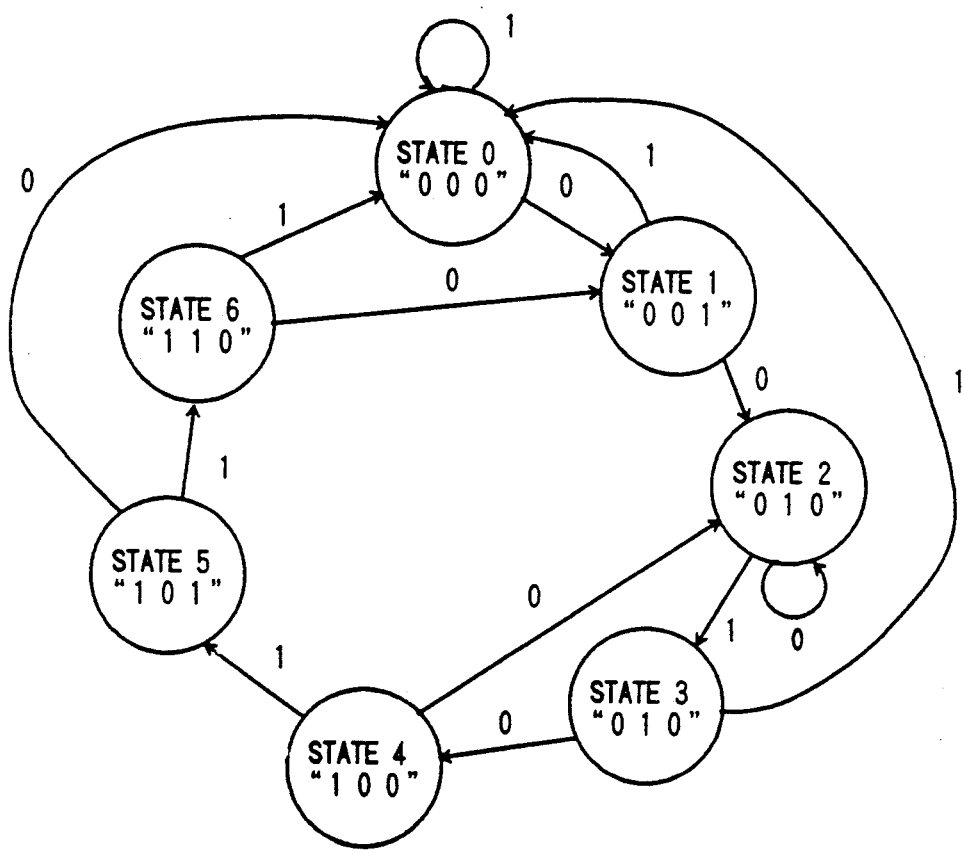
FIG. 4 is a state transition chart to explain the operation of the circuit for multiframe synchronization in FIG. 1.

The operation of the multi-point monitoring circuit for multiframe synchronization of the above construction will be described by reference to FIG. 4. When a first bit of the 24 multiframe signal 16 is applied from the receiving circuit in synchronism with the receiving clock pulse, a 3-bit-wide state bit pattern is applied from the state transition shift register 11 in synchronism with the clock pulse. The state bit pattern at this time is the initial "000" state, or the state "0" (FIG. 4).

The state decision circuit 13 reads out the expected value "0" to be expected for the input at the state "0" by reference to the memory 14 (FIG. 3) and compares to the 24 multiframe signal 16. If they are the same, i.e., if the 24 multiframe signal 16 is "0", the state decision circuit 13 causes state transition to output "001" which is the state bit pattern representing the state "1". If they are different, i.e., if the 24 multiframe signal 16 is "1", the state decision circuit 13 does not cause state transition and outputs the same state bit pattern "000". The state bit pattern thus outputted is applied to the state transition shift register 11 at its input through the data bus 15. It is assumed here, however, that the state transition to "1" has occurred to output the state bit pattern "001".

The above operation will be repeated for 4 frames, i.e., 4×193 bits and either state bit pattern "000" or "001" is sequentially stored in the state transition shift register 11 in accordance with a result of each decision.

On completing the processing for the 4-frame bit data, the 4-frame-old state bit pattern "001" is applied from the state transition shift register 11 in synchronism with the (4×193+1)-th bit of the 24 multiframe signal 16. The state decision circuit 13 refers to the memory 14 to read out the expected value "0" for the state "1" represented by the state bit pattern and compares it with the 24 multiframe signal 16. If they are the same, i.e., if the 24 multi-frame signal 16 is "0", the state transition circuit 13 transits the state and outputs the state bit pattern "010" representing state "2". If they are different, i.e., if the 24 multiframe signal 16 is "1", the state decision circuit 13 outputs the state bit pattern "000" to return to state "0". Such state bit pattern is applied to the state transition shift register 11 at the input side thereof by way of the data bus 15. It is assumed here that the state transition to "2" has occurred to output the state bit pattern "010". Again, the above operation is repeated for the 4-frame bit data for sequentially storing the state bit pattern in the state transition shift register 11 in accordance with the decision on each bit.

When the (4×193+1)-th bit of the 24 multiframe signal 16 is again applied after processing the 4-frame bit data, the 4-frame-old state bit pattern "010" is applied from the state transition shift register 11 in synchronism with the signal. The state decision circuit 13 refers to the memory 14 to read out the expected value "1" for the state "2" represented by the state bit pattern and compares it with the 24 multiframe signal 16. If they are the same, i.e., if the 24 multiframe signal 16 is "1", the state decision circuit 13 causes state transition and outputs the state bit pattern "011" representing state "3".

On the other hand, if they are different, i.e., if the 24 multiframe signal 156 is "0", the state decision circuit 13 continues to output the state bit pattern "010". The reason why state "2" is maintained rather than returning to state "0" is to avoid possible improper operation. That is, the pattern "00" for the 2 bits applied by this time is the same as the bit pattern "00" in the normal path from state "0" to state "2" by way of state "1". This state may correspond the first 2 bits of the multiframe sync pattern "001011".

Such output state bit pattern is applied to the state transition shift register 11 by way of the data bus 15. It is assumed now that the state transition to "3" has occurred to output the state bit pattern "011".

Operations are repeated in a similar manner to the above for the incoming 24 multiframe signal 16 at every 4 frames. A comparison is made between the incoming signal and the expected value for each state in the memory 14. A state transition takes place if they are the same. When transition from state "3" to "4" is taking place, if the 24 multiframe signal 16 is "1" and does not coincide with the expected value "0", the state decision circuit 13 decides to return to state "0" and outputs the state bit pattern "000". The reason is that the input bit at that time and the 4-frame-old bit pattern "11" do not coincide with any bit pattern in the normal path from state "0" through state "3".

On the other hand, when transition from state "4" to "5" is taking place, if the 24 multiframe signal 16 is "0" and does not coincide with the expected value "1", the state decision circuit 13 decides to return to state "2" and outputs the state bit pattern "010". This is because the input bit at that time and the 4-frame-old bit pattern "00" are identical to the bit pattern "00" in the normal path from state "0" to "2" by way of state "1". This may be identical to the first 2 bits of the multiframe sync pattern "001011".

It is assumed now that the system has reached state "5" through the above process. When the incoming 24 multiframe signal 16 is "1", the state decision circuit 13 decides to coincide with the expected value in the memory 14 and outputs the state bit pattern "110" representing state "6". Also, a sync pattern coincident signal 17 is generated by judging that the input bit pattern at every old 4 frames over 24 frames was identical to the multiframe sync pattern "001011".

On the contrary, if the 24 multiframe signal 16 is "0", it is determined that the input bit pattern in every old 4 frames over 24 frames was not the multiframe sync pattern "001011" and the state bit pattern "000" is generated to cause the system to return to state "0" again. It is assumed here that the system transits to state "6" to output the state bit pattern "110". Under state "6", if the 24 multiframe signal 16 is "0" which coincides with the expected value within the memory 14, the state decision circuit 13 outputs the state bit pattern "001" to cause the system to transit to state "1" again. Subsequently, monitoring is made if the 24 multiframe signal 16 is the same as the expected value in each state.

On the other hand, if the 24 multiframe signal 16 is "1", the state decision circuit 13 determines that the multiframe sync is not established or once established sync has been failed. Then, the state decision circuit 13 outputs an out-of-sync signal 19 and generates the state bit pattern "000" to cause state transition to "0". In this case, the aforementioned series of operations will be repeated until sync is established for each state.

According to this embodiment, multiframe sync can be established by simply using 3-bit-wide, 4×193 bit long shift register with the total capacity of 2316 bits.

Although the input 24 multiframe signal 16 is a 24 multiframe signal in the particular embodiment, the present invention is not limited only to such particular multiframe signal. For example, in case of a 12 multiframe signal as shown in FIG. 5, there are 13 states which can be expressed with 4 bits. Accordingly, the state transition shift register 11 requires 4 bit wide and 193 bit long shift registers with 772 bits total capacity as described hereunder. It is of course necessary to store the expected value in the memory 14 for 13 kinds of state bit pattern.

Referring again to FIG. 1, the state decision circuit 13 is configured to sequentially input bit data of a 12 multiframe signal 16 in synchronism with the receiving clock pulse from the receiving circuit and also receives a 4-bit-wide bit pattern from the state transition shift register 11.

Figures 6, 7:
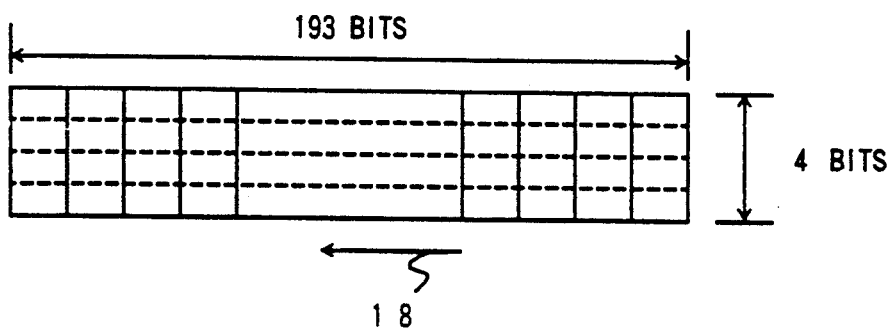
FIG. 6 is an internal construction of a state transition shift register in the circuit for multiframe synchronization in FIG. 1.
FIG. 7 is another explanatory drawing to show the contents in the memory in the circuit for multiframe synchronization in FIG. 1.

As shown in FIG. 6, the state transition shift register 11 is a 4-bit-wide and 193 bit long shift register. If shifts 4-bit input from the output side of the state decision circuit 13 as a set sequentially in the direction as shown by an arrow 18. The length 193 bits of the state transition shift register 11 is equivalent to the 1-frame data of the 12 multiframe data as illustrated in FIG. 5. Initially, the state transition shift register 11 is reset to all "0".

FIG. 7 illustrates the contents in the memory 14. As illustrated in FIG. 7, the memory 14 stores the state bit pattern, or 13 transition states (FIG. 8) to be subjected to decision of the state decision circuit 13 along with the expected value at each state.

The state decision circuit 13 compares the expected value from the memory 14 with the 12 multiframe signal 16 at the time when a state bit pattern is applied from the state transition shift register 11. A sync coincident signal 17 is generated when the total 12 bits at every one frame are equal to the multiframe sync pattern "100011011100".

Figure 8:
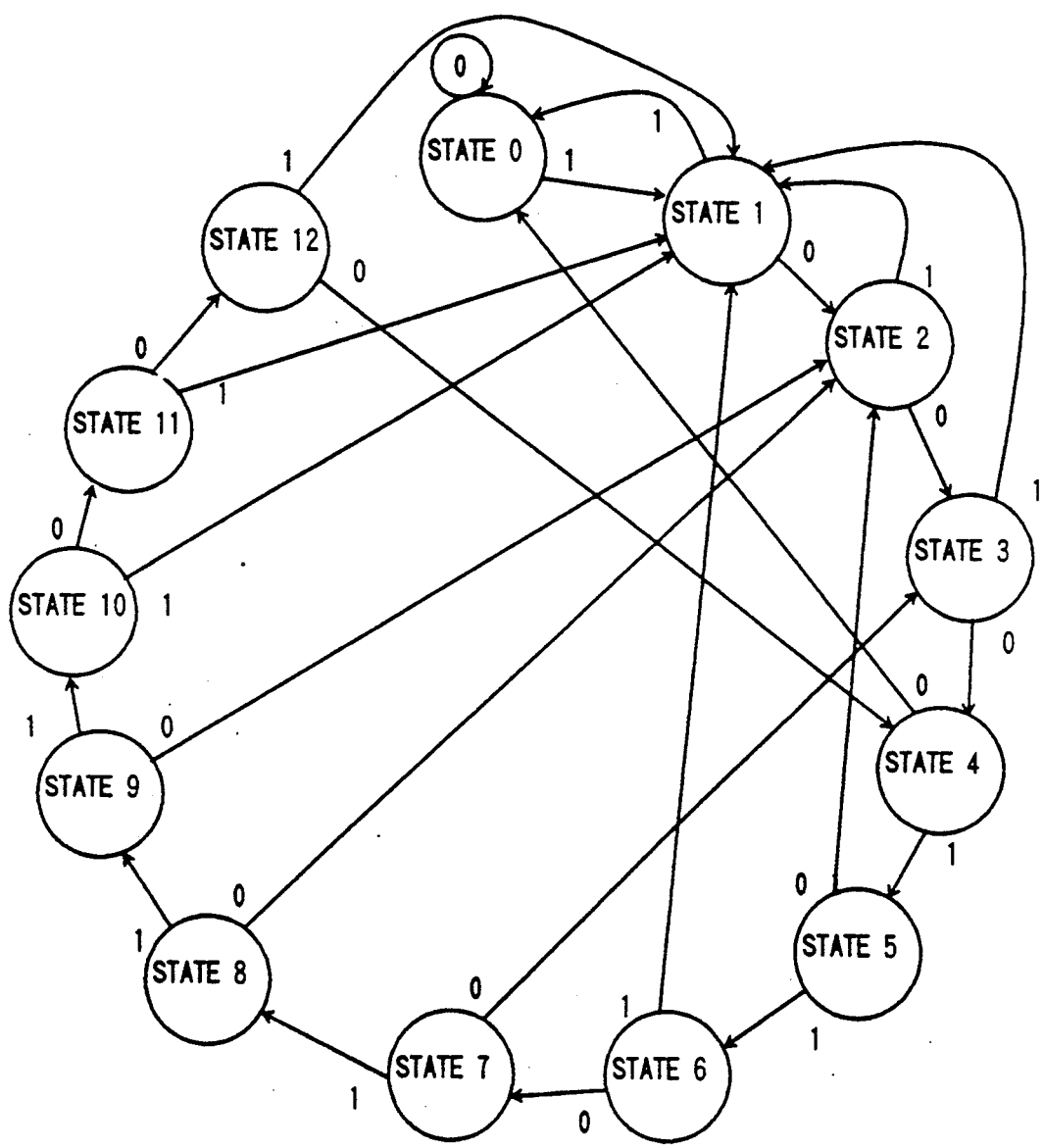
FIG. 8 is a state transition chart to explain the operation of the circuit for multiframe synchronization in FIG. 1.

The operation of the multi-point monitoring circuit for multiframe synchronization of the above construction will be described by reference to FIG. 8. When a first bit of the 12 multiframe signal is applied from the receiving circuit in synchronism with the receiving clock pulse, a 4-bit-wide state bit pattern is applied from the state transition shift register 11 in synchronism with the clock pulse. The state bit pattern at this time is the initial "0000" state, or the state "0" (FIG. 8).

The state decision circuit 13 reads out the expected value "1" to be expected for the input at the state "0" by reference to the memory 14 (FIG. 7) and compares with the 12 multiframe signal 16. If they are the same, i.e., if the 12 multiframe signal 16 is "0", the state decision circuit 13 causes state transition to output "0001" which is the state bit pattern representing the state "1". If they are different, i.e., if the 12 multiframe signal 16 is "1", the state decision circuit 13 does not cause state transition and outputs the same state bit pattern "0000". The state bit pattern thus outputted is applied to the state transition shift register 11 at its input through the data bus 15. It is assumed here, however, that the state transition to "1" has occurred to output the state bit pattern "0001".

The above operation will be repeated for 1 frames, i.e., 193 bits and either state bit pattern "0000" or "0001" is sequentially stored in the state transition shift register 11 in accordance with a result of each decision.

On completing the processing for the 1-frame bit data, the 1-frame-old state bit pattern "0001" is applied from the state transition shift register 11 in synchronism with the (1×193+1)-th bit of the 12 multiframe signal 16. The state decision circuit 13 refers to the memory 14 to read out the expected value "0" for the state "1" represented by the state bit pattern and compares it to the 12 multiframe signal. If they are the same, i.e., if the 12 multiframe signal 16 is "0", the state transition circuit 13 transits the state and outputs the state bit pattern "0010" representing state "2". If they are different, i.e., if the 12 multiframe signal 16 is "1", the state decision circuit 13 outputs the state bit pattern "0001" to return to state "1". Such state bit pattern is applied to the state transition shift register 11 at the input side thereof by way of the data bus 15. It is assumed here that the state transition to "2" has occurred to output the state bit pattern "0010". Again, the above operation is repeated for the 1-frame bit data for sequentially storing the state bit pattern in the state transition shift register 11 in accordance with the decision on each bit.

When the (1×193+1)-th bit of the 12 multiframe signal is again applied after processing the 1-frame bit data, the 1-frame-old state bit pattern "0010" is applied from the state transition shift register 11 in synchronism with the signal. The state decision circuit 13 refers to the memory 14 to read out the expected value "0" for the state "2" represented by the state bit pattern and compares it to the 12 multiframe signal. If they are the same, i.e., if the 12 multiframe signal is "0", the state decision circuit 13 causes state transition and outputs the state bit pattern "0011" representing state "3".

On the other hand, if they are different, i.e., if the 12 multiframe signal is "1", the state decision circuit 13 continues to output the state bit pattern "0001" and returns to the state "1". Such output state bit pattern is applied to the state transition shift register 11 by way of the data bus 15. It is assumed now that the state transition to "3" has occurred to output the state bit pattern "0011".

Operations are repeated in a similar manner to the above for the incoming 12 multiframe signal at every 1 frame. A comparison is made between the incoming signal and the expected value for each state in the memory 14. A state transition takes place if they are the same. When transition from state "3" to "4" is taking place, if the 12 multiframe signal 16 is "1" and does not coincide with the expected value "0", the state decision circuit 13 decides to return to state "1" and outputs the state bit pattern "0001".

On the other hand, when transition from state "4" to "5" is taking place, if the 12 multiframe signal 16 is "0" and does not coincide with the expected value "1", the state decision circuit 13 decides to return to state "0" and outputs the state bit pattern "0000".

It is assumed now that the system has reached state "11" through the above process. When the incoming 12 multiframe signal is "0", the state decision circuit 13 judges to coincide with the expected value in the memory 14 and outputs the state bit pattern "1100" representing state "12". Also, a sync pattern coincident signal 17 is generated by judging that the input bit pattern at every old 1 frame over 12 frames was identical to the multiframe sync pattern "100011011100".

On the contrary, if the 12 multiframe signal is "1", it is determined that the input bit pattern in every old 1 frame over 12 frames was not the multiframe sync pattern "100011011100" and the state bit pattern "0001" is generated to cause the system to return to state "1". It is assumed here that the system transits to state "12" to output the state bit pattern "1100".

Under state "12", if the 12 multiframe signal is "1" which coincides with the expected value within the memory 14, the state decision circuit 13 outputs the state bit pattern "0001" to cause the system to transit to state "1" again. Subsequently, monitoring is made if the 12 multiframe signal is the same as the expected value in each state. On the other hand, if the 12 multiframe signal is "0", the state decision circuit 13 determines that the multiframe sync is not established or once established sync has been failed. Then, the state decision circuit 13 outputs an out-of-sync signal 19 and generates the state bit pattern "0100" to cause state transition to "4". In this case, the aforementioned series of operations will be repeated until sync is established for each state.

According to this embodiment, multiframe sync can be established by simply using 4-bit-wide, 1×193 bit long shift register with the total capacity of 772 bits.

Although the expected value for each state is stored in the memory in the particular embodiment, the present invention is not limited to such embodiment only. A hard wired logic may be used to set the expected value. In such alternative embodiment, faster operation may be achieved using a smaller scale circuit.

As understood from the above description, such state of the multiframe signal leading to synchronization is sequentially stored in the shift register. A subsequent state is determined from the current input bit and the old state by the frame bit period. Such data is also stored in the shift register to reduce the bit capacity of the shift register. Accordingly, synchronization of a multiframe signal can be detected using smaller scale circuits.

What is claimed is:

1. A circuit for synchronizing a multiframe signal based upon a multiframe synchronization pattern of a plurality of frame bits inserted in said multiframe signal at a predetermined period comprising:

a shift register for storing and sequentially shifting state data each representing degree of a synchronization of said multiframe signal, the number of states corresponding to the number of said frame bits;

storage means to store the value of said multiframe synchronization pattern expected for an input including said multiframe synchronization pattern at each said state up to establishment of the multiframe synchronization;

a first read-out means for reading out a past transition state data by one frame for said predetermined period from said shift register in response to an input of said multiframe signal;

a second read-out means for reading out from said storage means the value of said multiframe synchronization pattern for said past transition state data read out by said first read-out means;

comparison means for comparing the value of said multiframe synchronization pattern read out by said second read-out means with a value of the multiframe synchronization pattern of said multiframe signal;

applying means to apply the state data representing transition state to the input of said shift register in response to detection of the coincident by said comparison means; and determining means to determine establishment of multiframe synchronization when the state transition to a predetermined state occurs.

2. A multi-point monitoring circuit for synchronizing a multiframe signal based upon a multiframe synchronization pattern of a plurality of frame bits inserted in said multiframe signal comprising:

a shift register to store state data each representing degree of the synchronization up to an establishment of the synchronization;

determining means to determine a next transition state based on a next multiframe synchronization pattern and a past transition state data by one frame for the predetermined period stored in said shift register in response to the input of a new multiframe signal; and decision means to decide the establishment of the synchronization by comparing the outputs of said shift register and determining means.

3. A synchronizing method of a multiframe signal based upon a multiframe synchronization pattern of a plurality of frame bits inserted in said multiframe signal at a predetermined period comprising steps of:

storing in a shift register and sequentially shifting state data each representing degree of a synchronization of said multiframe signal, the number of states corresponding to the number of said frame bits;

reading out the past state data for said predetermined period from said shift register in response to an input of said multiframe signal;

reading out a value of said multiframe synchronization pattern for the state data read out from said shift register from a memory in which values of said multiframe synchronization pattern expected for an input including said multiframe synchronization pattern at said each state up to establishment of a multiframe synchronization;

comparing the read out value of said multiframe synchronization pattern with the input multiframe signal;

applying the state data representing a next transition state to the input of said shift register in response to the detection of the coincident by said comparison; and determining establishment of multiframe synchronization when the state transition to a predetermined state occurs.

4. A circuit for achieving synchronization of a signal stream comprising a succession of packets, each of said packets comprising a plurality of units, said plurality of units including a first unit and a final unit, each of said plurality of units having embedded within it a framing bit, such that values of a succession of said framing bits, beginning with the framing bit within the first unit and ending with the framing bit within the final unit, form a predetermined pattern, wherein said synchronization refers to successful determination of which of said plurality of units within one of said succession of packets is the first unit of said succession of packets, by comparing a plurality of said framing bits with said predetermined pattern, the circuit including a memory for holding said predetermined pattern, the circuit further including a state decision circuit comprising:

means for performing a first comparison of the value of a first one of said framing bits with a first expected value, said first expected value being the value expected from the framing bit within the first unit based on the predetermined pattern, and setting a state transition register to a value consistent with the result of the first comparison;

means for performing a second comparison of the value of a second one of said framing bits with a second expected value, said second expected value being determined by the predetermined pattern and by the value of the state transition register, and setting the state transition register to a value consistent with the result of the second comparison; and means for indicating when said synchronization has occurred, once the state decision circuit has set the state transition register with a predetermined value.

5. A method for achieving synchronization of a signal stream comprising a succession of packets, each of the packets comprising a succession of units, each of the units occupying a place order within the succession of units within one of said succession of packets, wherein said synchronization occurs upon identification of the place order of one of the succession of units within said one of said succession of packets, said method comprising the steps of:

(A) initializing a state counter to a first value;

(B) examining framing bit information from one of said succession of units;

(C) advancing the state counter if said framing bit information matches apriori information expected from one of said units having a place order which corresponds to the current value of the state counter;

(D) examining framing bit information from a next one of said succession of units;

(E) advancing the state counter if said framing bit information matches apriori information expected from one of said units having a place order which corresponds to the current value of the state counter; and (F) declaring establishment of said synchronization if the state counter has reached an apriori value signifying successful synchronization, and otherwise, repeating steps D through F until the state counter reaches the apriori value signifying successful synchronization.

* * * * *

UNITED STATES PATENT AND TRADEMARK OFFICE
CERTIFICATE OF CORRECTION

PATENT NO. : 5,301,195
DATED      : April 5, 1994
INVENTOR(S) : Atsushi Hasegawa It is certified that error appears in the above-indentified patent and that said Letters Patent is hereby corrected as shown below:

Column 5, line 2, delete "156", and insert --16--

Signed and Sealed this

Twenty-seventh Day of September, 1994

Attest:

BRUCE LEHMAN

Attesting Officer        Commissioner of Patents and Trademarks